United States Patent [19]

Golino et al.

[11] Patent Number: 4,532,228

[45] Date of Patent: Jul. 30, 1985

[54] TREATMENT OF MONOLITHIC CATALYST SUPPORTS

[75] Inventors: Carlo M. Golino, Caton; Irwin M. Lachman; Lawrence A. Nordlie, both of Corning, all of N.Y.

[73] Assignee: Corning Glass Works, Corning, N.Y.

[21] Appl. No.: 571,926

[22] Filed: Jan. 19, 1984

[51] Int. Cl.$^3$ .................... B01J 21/04; B01J 23/42; B01J 23/44; B01J 23/46
[52] U.S. Cl. .................... 502/261; 502/262; 502/325; 502/332; 502/339; 502/439; 502/527; 423/213.5
[58] Field of Search .............. 502/439, 527, 261, 262, 502/325, 332, 339; 423/213.5; 428/116

[56] References Cited

U.S. PATENT DOCUMENTS

| | | | |
|---|---|---|---|
| 3,578,471 | 5/1971 | Lachman | 501/119 |
| 3,894,965 | 7/1975 | Foster et al. | 502/527 X |
| 3,985,683 | 10/1976 | Stenzel | 502/527 X |
| 4,327,188 | 4/1982 | Endo et al. | 502/242 X |
| 4,451,517 | 5/1984 | Inoguchi et al. | 502/527 X |
| 4,483,940 | 11/1984 | Ono et al. | 423/213.5 |

Primary Examiner—W. J. Shine
Attorney, Agent, or Firm—C. S. Janes, Jr.

[57] ABSTRACT

This invention is concerned with the production of catalyst-coated, ceramic honeycomb structures wherein the ceramic contains microcracks and wherein a washcoat is applied to the honeycomb structures prior to the application of the catalyst. The invention contemplates depositing an organic material in the microcracks and, preferably, carbonizing said organic material prior to application of the washcoat, and which is burned out after application of the washcoat.

11 Claims, No Drawings

TREATMENT OF MONOLITHIC CATALYST SUPPORTS

BACKGROUND OF THE INVENTION

The automobile exhaust emission standards legislated in the early 1970s led to crash programs in industry to devise catalytic reactors for oxidizing carbon monoxide and unburned hydrocarbons. 1975 saw the introduction of production model automobiles equipped with catalytic converters. Monolithic catalyst supports and bead-type catalyst supports have been employed in the automotive industry; the design flexibility afforded by the monoliths has been a very important factor in recommending their use in automobile exhaust converters.

Monolithic catalytic supports are continuous, unitary structures consisting of a plurality of small parallel passages running in alignment with the longitudinal axis of the structure and separated by thin walls. Such structures have been termed honeycombs. In some instances the structure will have discontinuities extending transversely through the walls. A multitude of materials has been suggested and tested for use in monolithic support structures; e.g., alumina, alumina-silica, zirconia-alumina, zirconia-magnesia, mullite, zircon, zircon-mullite, titania, spinel, zirconia, $Si_3N_4$, and carbon. However, only bodies composed of sintered cordierite ($2MgO.2Al_2O_3.5SiO_2$) or $\beta$-spodumene solid solution ($Li_2O.Al_2O_3.2-8SiO_2$) have seen extensive service in that utility.

$\beta$-spodumene solid solution exhibits a very low coefficient of thermal expansion, but its maximum long term use temperature of less than 1200° C. severely restricts its applicability in automotive emissions control devices.

Cordierite, or cordierite in combination with a compatible refractory phase, frequently mullite, has comprised the most extensively used material for substrate or support structure for automobile catalytic converters.

In searching for materials demonstrating relatively low coefficients of thermal expansion with higher refractoriness than cordierite, aluminum titanate-based compositions have been developed. Early examples of such products include U.S. Pat. No. 3,549,400, which discloses refractory bodies characterized by grain boundary and intracrystalline cracking having compositions in the $Al_2O_3$—$TiO_2$-chrome ore system, and U.S. Pat. No. 3,578,471, which describes refractory bodies also characterized by grain boundary and intracrystalline cracking, but having compositions in the $Al_2O_3$—$TiO_2$—$MgO$ system. More recent disclosures include U.S. Pat. No. 4,118,240 describing sintered bodies consisting of aluminum titanate with minor amounts of $SnO_2$ and $SiO_2$; and U.S. Pat. No. 4,327,188 discussing the fabrication of substrates for catalytic converters from sintered compositions consisting of aluminum titanate and $SiO_2$ to which $Y_2O_3$ and/or $La_2O_3$ and/or $CeO_2$ may optionally and desirably be incorporated. Finally, U.S. application Ser. No. 517,751, filed July 27, 1983 by J. P. Day and I. M. Lachman under the title Aluminum Titanate-Mullite Ceramic Articles, is directed to the formation of sintered articles wherein aluminum titanate and mullite constitute the predominant crystal phases to which minor amounts of $Fe_2O_3$ and/or rare earth metal oxides may be included.

The ceramic material comprising the monolithic substrate will exhibit porosity such that the walls of the passages provide sites for the adhesion of the high surface area washcoat which is applied prior to or in concert with the deposit of the catalyst. Furthermore, as was explained in Ser. No. 517,751, sintered ceramic articles containing aluminum titanate as a predominant crystal phase have microstructures with grain boundary and intracrystalline microcracking. Such microcracking enables the articles to yield under thermal stress, thereby significantly improving the thermal shock resistance thereof.

In addition to the choice of starting materials used in forming ceramic bodies, one factor influencing the level of open porosity and the size of the pores is the sintering temperature employed; i.e., higher temperatures will normally lead to lower values of open porosity and smaller pore size. For example, when the compositions of Ser. No. 517,751 are sintered at 1400° C., open porosity will average about 30–45%, but when sintered at 1500° C., porosity drops to about 8–26%. In like manner, the pore size will range from about 1–15 microns depending upon the sintering temperature utilized. In general, the preferred open porosity interval is between about 25–45% with pore sizes between about 5–15 microns.

As can well be appreciated, maximum benefit of catalytic activity will be attained when the catalyst is deposited upon a substrate of very high surface area, such that the greatest number of sites will be available for contact with the fluid passing thereover. In general, the ceramic monolithic supports have surface areas of only about 0.1–1 meter$^2$/gram ($m^2/g$). Therefore, coatings exhibiting very high surface areas (frequently about 50–200 $m^2/g$) have commonly been applied to the supports in amounts of about 5–20% by weight of the substrate. Those coatings, termed "washcoats" in the industry, most frequently consist principally of aqueous slurries of gamma-$Al_2O_3$. Immersion in an aqueous slurry or the use of an injection process comprise the simplest methods for coating the monolithic support. The coated substrate is at least partially dried and heated to a temperature sufficient to bind the $Al_2O_3$-containing particles together. Thereafter, the support is impregnated through an immersion or injection process with a solution of a base metal and/or noble metal catalyst. Currently in the automotive field, one or more of the noble metals palladium, platinum, and rhodium is utilized as the catalyst. Hence, in common practice a solution is prepared of a thermally decomposable compound of at least one of those metals, e.g., $H_2PdCl_6$, $H_2PtCl_6$, and $H_2RhCl_6$. After at least partial drying, the coated structure is fired to a temperature sufficient to thermally decompose those compounds to metallic particles.

Whereas the customary procedure contemplates serially applying the washcoat and catalyst, as described immediately above, it is also possible to mix the catalyst solution with the washcoat and then impregnate the substrate with the combination. That practice eliminates one coating step, but there has been some question as to the equivalent uniformity of catalyst available for reaction.

As has been observed above, sintered structures containing aluminum titanate as the predominant crystal phase evidence microstructures exhibiting grain boundary and intracrystalline microcracking. That phenomenon enhances the utility of such compositions since it greatly improves the thermal shock resistance of bodies fabricated therefrom. However, when monolithic catalytic supports were prepared in accordance with the procedure outlined above, cracking and breakage thereof resulted when they were plunged into a furnace operating at about 500° C., that being a standard test for thermal shock resistance. The coefficient of thermal expansion was measured on the defective products and discovered to be about $45 \times 10^{-7}$/°C. over the range of room temperature (R.T.)–1000° C., whereas the initial, uncoated body exhibited a coefficient of thermal expansion of less than about $5 \times 10^{-7}$/°C. over the range of R.T.–1000° C. This dramatic increase in thermal expansion is believed to be due to two phenomena occurring from the $Al_2O_3$-containing washcoat penetrating into the microcracks. Substantial thermal strains are developed because the crystals of the support cannot expand into the microcracks when the support is heated. Furthermore, the washcoat material demonstrates a high coefficient of thermal expansion, normally in excess of about $75 \times 10^{-7}$/°C. (R.T.–1000° C.). The effect of these two factors is to sharply raise the overall expansion of the body.

Accordingly, the principal objective of the instant invention is to provide means for preventing the entry of the washcoat into the microcracks of a sintered ceramic substrate.

SUMMARY OF THE INVENTION

We have found that objective can be achieved by treating the initial sintered structure with a fugitive material to infiltrate the microcracks thereof, thereby inhibiting the washcoat from entering therein. The fugitive material is subsequently volatilized or burned out. Organic materials comprise the preferred fugitive materials.

Operable organic materials and their means of use can be categorized into the following four general groups:

(a) Infiltration with an aqueous solution of an organic compound, e.g., a sugar such as dextrose or sucrose, followed by drying to remove the water. This procedure has the disadvantage of not entirely filling the microcracks because part of the solution, i.e., the water, is removed prior to the application of the washcoat. The washcoat may be applied directly after the drying step; however, the preferred practice contemplates firing the dried organic material to a sufficiently high temperature to carbonize it, thus insuring that it remains in the microcracks. Where the washcoat is simply applied to the dried organic residue, there is the likelihood of some of the residue being dissolved in aqueous washcoat slurry. Besides water soluble sugars, other useful organic materials include urea and low molecular weight, i.e., less than about 600 Daltons, polyfunctional compounds such as citric acid. As can be appreciated, an operable organic compound will carbonize (char) at a rate at least equivalent to, and more preferably, faster than the rate at which it volatilizes.

(b) Infiltration with an organic solution of a water insoluble compound followed by a drying step to remove the organic solvent. This embodiment is similar to that of (a) above but, when the washcoat is applied directly after the drying step, the possibility of the organic residue dissolving in the aqueous slurry is not present. Again, however, the preferred practice is to carbonize the organic residue prior to applying the washcoat. An example of an organic solution of a water insoluble compound is stearic acid dissolved in toluene.

(c) Infiltration with an organic liquid such as a monomeric compound and/or a low viscosity polymer which can be irreversibly hardened (chemically cured or thermally "set"). Examples of this embodiment of the inventive method include monomeric furfuryl alcohol cured with hydrochloric acid, polyfurfuryl alcohol cured with a mineral or organic acid having a pKa below 5, thermosetting phenol/formaldehyde resin systems, and acrylonitrile cured with an alkali catalyst. Because this practice completely fills the microcracks prior to the application of the washcoat slurry, it avoids that problem inherent in procedures (a) and (b) above. Once again, however, it is preferred that the organic material be carbonized before applying the washcoat to assure the best final uniformity of the latter.

(d) Infiltration with a molten, water insoluble, organic compound which exists as a low vapor pressure solid at room temperature. This material will, most desirably, have a melting point less than about 150° C. and demonstrate good thermal stability in the molten state. The infiltrated substrate will be drained to remove excess liquid and cooled to solidify the residue in the microcracks. Thereafter, the washcoat is applied and the body then fired to extract the organic. As can be appreciated, the material cannot be carbonized prior to applying the washcoat. Firing must be undertaken with care not to significantly disturb the uniformity of the washcoat. An illustration of an organic material commending itself to this inventive embodiment is hexatriacontane, which has a melting point of 75° C., is inert chemically, and exhibits thermal stability.

In the most general terms, the method of the invention comprises the following basic steps:

(1) the monolithic support is infiltrated with a fluid containing a fugitive material selected from the group of an aqueous solution of an organic compound, an organic solution of a water insoluble organic compound, an organic liquid which can be irreversibly hardened through a chemical or thermal reaction, and a molten, water insoluble organic compound which exists as a low vapor pressure solid at ambient temperature;

(2) the organic compound is at least partially solidified in the microcracks (e.g., through drying, polymerizing, cooling); with the preferred embodiment contemplating carbonizing the organic compound in the microcracks;

(3) a high surface area washcoat, which may contain catalyst-providing material, is applied to said support;

(4) the coated support is heated to a temperature sufficient to bind the particles of said washcoat together and to burn out or volatilize the fugitive material from the microcracks;

(5) where the washcoat did not contain catalyst-providing material, the coated support is impregnated with a solution containing a compound which can provide a base metal and/or noble metal catalyst; and (6) the coated support is heated to a temperature sufficient to provide a deposit of a catalytically-active base metal compound and/or metallic particles of a noble metal; the deposit customarily resulting from a thermal conversion of the compound in paragraph (5).

As has been observed previously, the catalyst customarily utilized in the automotive field has consisted of one or more of the noble metals palladium, platinum, and rhodium. Application of the catalyst has commonly involved impregnating a washcoat-coated monolith or bead-type support with a solution prepared from a thermally decomposable compound of at least one of those metals, e.g., $H_2PdCl_6$, $H_2PtCl_6$, and $H_2RhCl_6$. Such a catalyst is preferred in the present inventive method.

Carbonizing of the organic material, when appropriate, is accomplished by firing the support (frequently in a non-oxidizing environment such as an atmosphere of inert gas) to a temperature in excess of 250° C., conveniently between about 400°–600° C. The washcoated support will be fired (normally in air) to a temperature in excess of about 400° C. to burn out or volatilize the fugitive material and bind the washcoat particles together. In general, the washcoat will comprise the aqueous slurry of gamma-$Al_2O_3$ described above. The support impregnated with the catalyst compound-containing solution will be fired to a temperature in excess of 350° C., conventionally with the thermally decomposable compounds of palladium, platinum, and/or rhodium to about 500° C., in an oxidizing or reducing atmosphere.

In summary, the presence of carbon-containing deposits in the microcracks prevents the entry of the washcoat therein. The subsequent firings of the support coated with the $Al_2O_3$-containing particles are conducted at sufficiently low temperatures that any significant sintering of these particles with the support material is avoided. Accordingly, the coefficient of thermal expansion of the initial monolithic support is not altered to any appreciable extent upon application of a washcoat.

DESCRIPTION OF PREFERRED EMBODIMENTS

Specimens 3″ long and 3″ in diameter were core drilled from a monolithic catalyst support with a configuration of 400 passages/in$^2$ consisting essentially, in weight percent, of about 50% aluminum titanate solid solution and 50% mullite.

The following table reports the results of a number of experiments conducted on those specimens. For example, one group of samples was vacuum infiltrated with an aqueous solution of 55% dextrose. The excess fluid was removed by draining and then blowing a stream of air through the passages. The samples were wrapped in aluminum foil and heated to 100° C. to steam dry the coating. Thereafter, the specimens were fired for three hours in an argon atmosphere to carbonize the coating.

Another group of samples was vacuum infiltrated with furfuryl alcohol, the excess liquid removed from the passages, and the organic polymerized overnight at ambient temperature in the presence of HCl vapors. Subsequently, the specimens were heated to 500° C. for three hours in an argon atmosphere to carbonize the polymer.

Both groups of samples exhibited a glossy black appearance after the heat treatment, thereby indicating the charring of the organic material in the pores and microcracks of the support. A washcoat was applied to the specimens through immersion into an $Al_2O_3$—containing slurry. After removing excess slurry, the samples were heated to about 500° C. in air for about 0.5 hour to bind the $Al_2O_3$—containing particles together and burn out the carbon lodged in the pores and microcracks.

Thereafter, certain of the specimens were fired in air at about 905° C. for one hour to simulate application of the catalyst in service.

The coefficient of thermal expansion (R.T. to 900° C.) and (900° C. to R.T.) was measured on each sample utilizing techniques conventional in the ceramic art.

TABLE

| | Specimen | Coefficient of Thermal Expansion | |
|---|---|---|---|
| | | R.T. - 900° C. | 900° C. - R.T. |
| 1. | Control: original sample | $0.3 \times 10^{-7}$/°C. | $2 \times 10^{-7}$/°C. |
| 2. | Control: no organic treatment; washcoat applied and fired in air at 500° C. | $44.8 \times 10^{-7}$/°C. | $40.5 \times 10^{-7}$/°C. |
| 3. | Control: no organic treatment; washcoat applied and fired in air at 500° C.; fired 1 hour in air at 905° C. | $34.9 \times 10^{-7}$/°C. | $33.3 \times 10^{-7}$/°C. |
| 4. | Control: treated in dextrose solution; fired for 3 hours in argon at 500° C. | $3.7 \times 10^{-7}$/°C. | $2.5 \times 10^{-7}$/°C. |
| 5. | Control: treated in dextrose solution; fired for 3 hours in argon at 500° C.; fired 1 hour in air at 1000° C. | $4.5 \times 10^{-7}$/°C. | $4.5 \times 10^{-7}$/°C. |
| 6. | Treated in dextrose solution; washcoat applied and fired in air at 500° C. | $38.5 \times 10^{-7}$/°C. | $33.8 \times 10^{-7}$/°C. |
| 7. | Treated in dextrose solution; washcoat applied and fired in air at 500° C.; fired 1 hour in air at 905° C. | $30.7 \times 10^{-7}$/°C. | $29.9 \times 10^{-7}$/°C. |
| 8. | Treated in dextrose solution; fired for 3 hours in argon at 500° C.; washcoat applied and fired in air at 500° C. | $26.1 \times 10^{-7}$/°C. | $24.2 \times 10^{-7}$/°C. |
| 9. | Treated in dextrose solution; fired 3 hours in argon at 500° C.; washcoat applied and fired in air at 500° C.; fired 1 hour in air at 905° C. | $17.9 \times 10^{-7}$/°C. | $21.0 \times 10^{-7}$/°C. |
| 10. | Treated in furfuryl alcohol; cured with HCl; washcoat applied and fired in air at 500° C. | $16.7 \times 10^{-7}$/°C. | $14.6 \times 10^{-7}$/°C. |
| 11. | Treated in furfuryl alcohol; cured with HCl; washcoat applied and fired in air at 500° C.; fired 1 hour in air at 905° C. | $14.3 \times 10^{-7}$/°C. | $15.0 \times 10^{-7}$/°C. |
| 12. | Treated in furfuryl alcohol; cured with HCl; fired 3 hours in argon at 500° C.; washcoat applied and fired in air at 500° C. | $12.8 \times 10^{-7}$/°C. | $13.3 \times 10^{-7}$/°C. |
| 13. | Treated in | $10.5 \times 10^{-7}$/°C. | $13.2 \times 10^{-7}$/°C. |

TABLE-continued

| Specimen | Coefficient of Thermal Expansion | |
|---|---|---|
| | R.T. - 900° C. | 900° C. - R.T. |
| furfuryl alcohol; cured with HCl; fired 3 hours in argon at 500° C.; washcoat applied and fired in air at 500° C.; fired 1 hour in air at 905° C. | | |

As can be observed from a comparison with Example 1, Example 2 illustrates the high expansion resulting from the application of the washcoat. Applying the subsequent high temperature air firing to Example 3 reduces the expansion somewhat because the temperature is sufficiently high to cause some sintering of the washcoat powder. Examples 4 and 5 are control samples demonstrating that the organic treatments per se exert no substantive effect upon the intrinsic expansion of the original sintered support.

Examples 6-9 show the consequences of treating the support with dextrose prior to the application of the washcoat. Hence, the dextrose only treatment, Example 6, reduces the expansion only slightly below that of Example 2, with the subsequent high temperature heat treatment, Example 7, reducing the expansion somewhat more. It is quite apparent, however, that the carbonizing of the dextrose makes a very significant difference (Example 8), and burning out the residual carbon plus causing some sintering (Example 9) provides an even greater improvement.

Examples 10-13 record a similar series to 6-9, but wherein polymerized furfuryl alcohol constituted the organic material instead of dextrose. All of those products exhibited relatively low expansions indicating that the organic remained within the microcracks, thereby preventing the intrusion of the washcoat therein. Carbonizing and then burning out the residual carbon (Example 12-13) appears to import some further improvement.

Whereas the increase in coefficient of thermal expansion caused by the application of a washcoat to a monolithic catalyst support fabricated from a sintered ceramic containing cordierite as the predominant crystal phase is not as pronounced as is evidenced in aluminum titanate-containing bodies, because the extent of microcracking therein is much less, laboratory testing has demonstrated that the thermal expansion of a standard cordierite support structure is raised from about $6.9 \times 10^{-7}$ to $13.4 \times 10^{-7}/°C$. over the range of R.T.-800° C. The inventive method is also applicable with such bodies.

We claim:
1. A method for fabricating a catalyst-coated, ceramic honeycomb structure, wherein the ceramic of said honeycomb structure contains microcracks, comprising the steps of:
  (a) said honeycomb structure is infiltrated with a fluid containing a fugitive material selected from the group of an aqueous solution of an organic compound, an organic solution of a water insoluble organic compound, a liquid organic compound which can be irreversibly hardened through a chemical or thermal reaction, and a molten, water-insoluble organic compound which exists as a low-vapor pressure solid at ambient temperature to inhibit the entry of a subsequently-applied high surface area washcoat into said microcracks;
  (b) the organic compound is solidified in the microcracks; solidification of said aqueous solution of an organic compound, said organic solution of a water-insoluble organic compound, said liquid organic compound which can be irreversibly hardened through a chemical or thermal reaction, and said molten, water-insoluble organic compound which exists as a low vapor pressure solid at ambient temperature being achieved through firing in a non-oxidizing atmosphere at a sufficiently high temperature to carbonize it and thereby render it insoluble in water;
  (c) a high surface area washcoat in the form of an aqueous slurry, which may optionally contain a catalyst-providing material, is applied to said support;
  (d) the coated support is heated in an oxidizing atmosphere to a temperature sufficient to bind the particles of said washcoat together and to burn out or volatilize said fugitive material from the microcracks;
  (e) where the washcoat in paragraph (c) does not contain catalyst-providing material, the coated support is impregnated with a solution containing a thermally decomposable compound which can provide a catalyst consisting of a base metal compound and/or metallic particles of a noble metal; and
  (f) the coated support is heated in an oxidizing or reducing atmosphere to a temperature sufficient to provide a deposit of a catalytically-active base metal compound and/or metallic particles of a noble metal through thermal conversion of the thermally decomposable compound.

2. A method according to claim 1 wherein said ceramic honeycomb structure contains aluminum titanate and mullite as the predominant crystal phases.

3. A method according to claim 1 wherein said ceramic honeycomb structure contains cordierite as the predominant crystal phase.

4. A method according to claim 1 wherein said water soluble compound is selected from the group of sugars, urea, and polyfunctional organic compounds having molecular weights less than about 600 Daltons.

5. A method according to claim 1 wherein said organic solution of a water insoluble compound is stearic acid dissolved in toluene.

6. A method according to claim 1 wherein said liquid organic compound that can be irreversibly hardened through a chemical or thermal reaction is selected from the group of furfuryl alcohol, polyfurfuryl alcohol, a thermosetting phenol/formaldehyde resin system, and acrylonitrile.

7. A method according to claim 1 wherein said water insoluble compound exists as a low vapor pressure solid at ambient temperature, but has a melting point less than about 150° C.

8. A method according to claim 1 wherein said washcoat consists principally of an aqueous slurry of gamma-$Al_2O_3$ particles.

9. A method according to claim 1 wherein said noble metal catalyst is selected from the group of Pd, Pt, and Rh.

10. A method according to claim 1 wherein said compound providing said noble metal catalyst is selected from the group of $H_2PdCl_6$, $H_2PtCl_6$, and $H_2RhCl_6$.

11. A method according to claim 7 wherein said water insoluble compound is hexatriacontane.

* * * * *